(12) United States Patent
Jung

(10) Patent No.: US 7,675,479 B2
(45) Date of Patent: Mar. 9, 2010

(54) MULTI-SCREEN SYSTEM AND MULTI-SCREEN IMPLEMENTATION METHOD

(75) Inventor: Suck Hwa Jung, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1257 days.

(21) Appl. No.: 11/192,114

(22) Filed: Jul. 29, 2005

(65) Prior Publication Data

US 2006/0158560 A1 Jul. 20, 2006

(30) Foreign Application Priority Data

Jan. 14, 2005 (KR) .................. 10-2005-003770

(51) Int. Cl.
*G09G 5/00* (2006.01)
(52) U.S. Cl. ........................................ 345/1.3; 345/1.1
(58) Field of Classification Search ........... 345/1.1–1.3; 348/588
See application file for complete search history.

(56) References Cited

U.S. PATENT DOCUMENTS 5,767,818 A * 6/1998 Nishida ...................... 345/1.1
5,914,698 A * 6/1999 Nicholson et al. ............ 345/1.3
5,986,622 A * 11/1999 Ong ........................... 345/1.1
5,987,532 A 11/1999 Tokui ............................ 710/9
6,501,441 B1 * 12/2002 Ludtke et al. ................ 345/1.1
2002/0071057 A1 * 6/2002 Kaneda et al. .............. 348/588

FOREIGN PATENT DOCUMENTS

EP 1381020 A2 * 1/2004
KR 10-2004-0043418 A 5/2004

OTHER PUBLICATIONS

European Search Report dated Mar. 17, 2008.
Korean Office Action dated Jul. 20, 2006.

* cited by examiner

*Primary Examiner*—Bipin Shalwala
*Assistant Examiner*—Ilana Spar
(74) *Attorney, Agent, or Firm*—Ked & Associates LLP

(57) ABSTRACT

A multi-screen system including a plurality of displaying devices for sequentially receiving request signals and separately storing corresponding IDs (IDentifications) included in the received request signals, and respectively outputting a response signal in response to a received request signal. Also included is an operating device for outputting a request signal including a corresponding ID, for outputting a new request signal if a response signal is received from a corresponding displaying device, and for transmitting control information about image segments to be respectively displayed on the displaying devices.

23 Claims, 5 Drawing Sheets

FIG. 4

| Address or ID | Command | Data |
|---|---|---|
| # 1 | 1/4 | |
| # 2 | 2/4 | |
| # 3 | 3/4 | |
| #4 | 4/4 | |

MULTI-SCREEN SYSTEM AND MULTI-SCREEN IMPLEMENTATION METHOD

This application claims the benefit of the Korean Application No. 10-2005-003770 filed on Jan. 14, 2005, which is incorporated by reference in its entirety.

BACKGROUND OF THE INVENTION

1. Field of the Invention

The present invention relates to a multi-screen system, and more particularly, to a multi-screen system and method for automatically splitting a video.

2. Discussion of the Related Art

A multi-screen system does not only display a variety of videos on a plurality of monitors, but also splits and displays a video on the monitors so as to magnify the display of the video. The multi-screen system is commonly seen in a stock exchange, a racetrack, a karaoki room or various places which require multi-screen systems.

FIG. 1 is a block diagram illustrating a related art multi-screen system. As shown, the related art multi-screen system includes an image source 11 such as Television (TV) or Personal Computer (PC), and a distributor 12 for splitting a video provided from the image source 11 and distributing the split video to a plurality of monitors 13. The distributor 12 splits the video, which is received from the image source 11, into a predetermined number of videos, and transmits the split videos to designated monitors.

Because the distributor 12 splits the entire video based on a user's input designating the number of terminals and transmits the split videos through a designated video-line, the distributor 12 cannot transmit the video to a newly added monitor without the user reconfiguring the system. In other words, to provide the video to a newly added monitor, a user has to reset the number of the split videos, and the added monitor has to be connected to a designated port of the distributor 12 through the video-line. Further, when an arrangement of the monitors 13 is changed, a connection relation of the monitors 13 and the ports also has to be changed.

SUMMARY OF THE INVENTION

Accordingly, one object of the present invention is to at least address the above and other noted problems.

Another object of the present invention is to provide a novel multi-screen system and method in which monitors are automatically recognized.

Yet another object of the present invention is to provide a novel multi-screen system and method in which a video is automatically split depending on the recognized monitors.

To achieve these objects and other advantages and in accordance with the purpose of the invention, as embodied and broadly described herein, the present invention provides a novel multi-screen system including a plurality of displaying devices for sequentially receiving request signals and separately storing corresponding IDs (IDentifications) included in the received request signals, and respectively outputting response signals in response to the received request signals. Also included is an operating device for outputting a request signal including a corresponding ID, for outputting a new request signal if a response signal is received from a corresponding displaying device, and for transmitting control information about image segments to be respectively displayed on the displaying devices.

Further, the displaying devices includes, for example, a controller for generating a response signal in response to a received request signal, and a switch which can be switched on to transmit a received request signal to another displaying device. In this instance, the controller switches on the switch in response to the request signal such that the new received request signal is passed to a next displaying device.

The displaying devices also includes, for example, an input port for receiving the request signal, a first output port for transmitting the response signal to the operating device, and a second output port for transmitting the received request signal to another displaying device. In addition, the response signal has information about a corresponding displaying device, including at least one of a resolution, a screen size, a luminance, or a chrominance.

Also, the displaying devices receive the control information about the image segments from the operating device, and respectively display only the image segments corresponding to their own IDs based on the received control information. Further, the operating device includes, for example, a controller for generating a request signal and control information, a transmitter for transmitting the request signal and the control information, and a receiver for receiving the response signal from the displaying devices.

The operating device also includes, for example, an output port for transmitting the request signal to one displaying device, and an input port for receiving response signals from the displaying devices. In addition, the control information has the IDs respectively allocated to the displaying devices, and positions and orders the image segments corresponding to the IDs. Further, the operating device selectively generates a new request signal and/or control information depending on whether or not the response signal is received.

In yet another aspect of the present invention, the present invention provides a novel multi-screen implementation method, which includes sequentially transmitting request signals having IDs (IDentifications) to a plurality of displaying devices, transmitting response signals to an operating device in response to the request signals, and transmitting control information about image segments to be respectively displayed on the displaying devices.

Further, sequentially transmitting the request signals includes transmitting a request signal to one of the displaying devices, determining whether or not a response signal in response to the request signal is received, and outputting at least one of a new request signal or control information depending on whether or not the response signal is received.

Further, when outputting the new request signal, the new request signal is passed to another displaying device if the response signal is received, or the control information is outputted if the response signal is not transmitted to the operating device. Also, the response signal includes information on the corresponding displaying device.

The present invention also provides a novel a multi-screen system including an operating device configured to be connected to a plurality of displaying devices and configured to transmit a first request signal including an identification (ID) to be allocated to a first displaying device of the plurality of displaying devices, and to transmit another request signal including another ID to be allocated to another displaying device of the plurality of displaying devices if a response signal in response to the first request signal is received from the first displaying device.

The present invention further provides a novel a multi-screen system including a first display including at least one switch and including a controller configured to control the at least one switch and to output a response signal in response to a received request signal, and a second display including at least one switch and including a controller configured to control the at least one switch and to output a response signal in response to a received request signal. Further, the first display receives a first request signal including a first IDentification (ID), and the controller of the first display assigns the first ID to the first display, controls the switch of the first display to be in an on-state, and outputs a first response signal in response to the first request signal, the first display receives a second request signal including a second ID and passes the second request signal to the second display via the switch of the first display being in the on-state, and the second display receives the second request signal including the second ID, and the controller of the second display assigns the second ID to the second display, controls the switch of the second display to be in an on-state, and outputs a second response signal in response to the second request signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein:

FIG. 4 is a view illustrating an example of control information according to the present invention;

DETAILED DESCRIPTION OF THE PREFERRED EMBODIMENTS

The present invention provides a novel operating device connected with a plurality of displaying devices through, e.g., a video-line and a bidirectional data line. An operating device according to the present invention may be included in an image source such as Television (TV), Personal Computer (PC), camcorder, Video Cassette Recorder (VCR), Personal Video Recorder (PVR), Portable Multimedia Player (PMP), etc. or the operating device may be a separate device connected with the image source.

Figure 1:
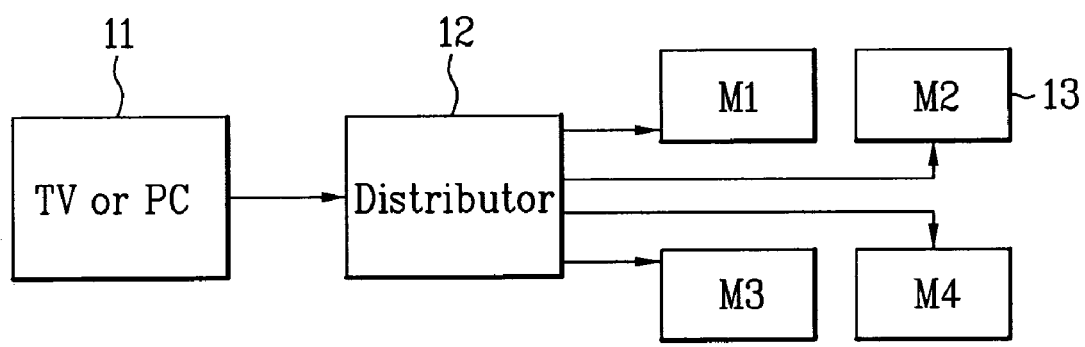
FIG. 1 is a block diagram illustrating a related art multi-screen system.
Figure 2:
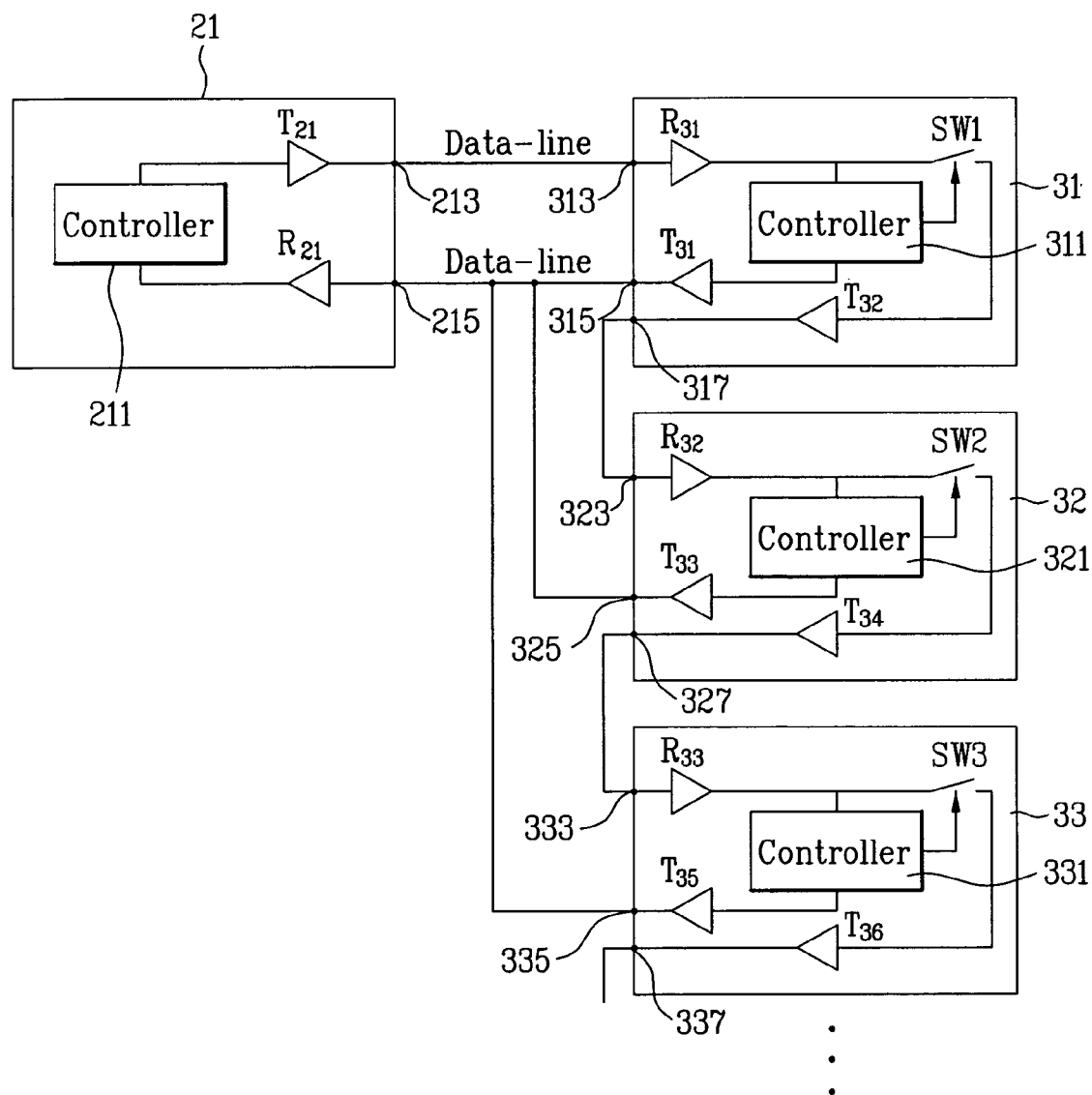
FIG. 2 is a schematic view illustrating a multi-screen system according to the present invention.

Turning now to FIG. 2, which illustrates an operating device 21 and a plurality of displaying devices 31, 32, 33..., which are connected using a bidirectional data line. As shown in FIG. 2, the operating device 21 includes a controller 211, a transmitter (T21), a receiver (R21), an output port 213, and an input port 215. Further, the controller 211 sequentially transmits a request signal to the displaying devices 31, 32, 33... through the transmitter (T21), and allocates an identification (ID) to each displaying device 31, 32, 33... Additionally, the controller 211 is configured to receive response signals from the displaying devices 31, 32, 33... through the receiver (R21), and recognizes the displaying devices 31, 32, 33... based on the received response signals. Further, as shown, the output port 213 of the operating device 21 is connected to the input port of preferably only the first displaying device 31, and the input port 215 is connected with the output ports 315, 325, 335... of the displaying devices 31, 32, 33...

In addition, as shown, the first displaying device 31 includes a controller 311, a receiver (R31), transmitters (T31, T32), an input port 313, output ports 315 and 317, and a switch (SW1). The first displaying device 31 also includes a screen (not shown). Additionally, the other displaying devices 32, 33... have similar elements as the first displaying device 31. Further, the displaying devices 31, 32, 33... receive the request signal from the operating device 21, generate response signals in response to the request signal, and then transmit the response signals to the operating device 21. The switches SW1, SW2, SW3... are sequentially and separately switched-on when a request signal from the operating device 21 is received.

In addition, the input and output ports included in the operating device 21 and the displaying devices 31, 32, 33... may be based on, e.g., RS 232. Further, the operating device 21 and the displaying devices 31, 32, 33... respectively include memories (not shown), and each of the displaying devices 31, 32, 33... additionally includes a video processor.

Figure 3:
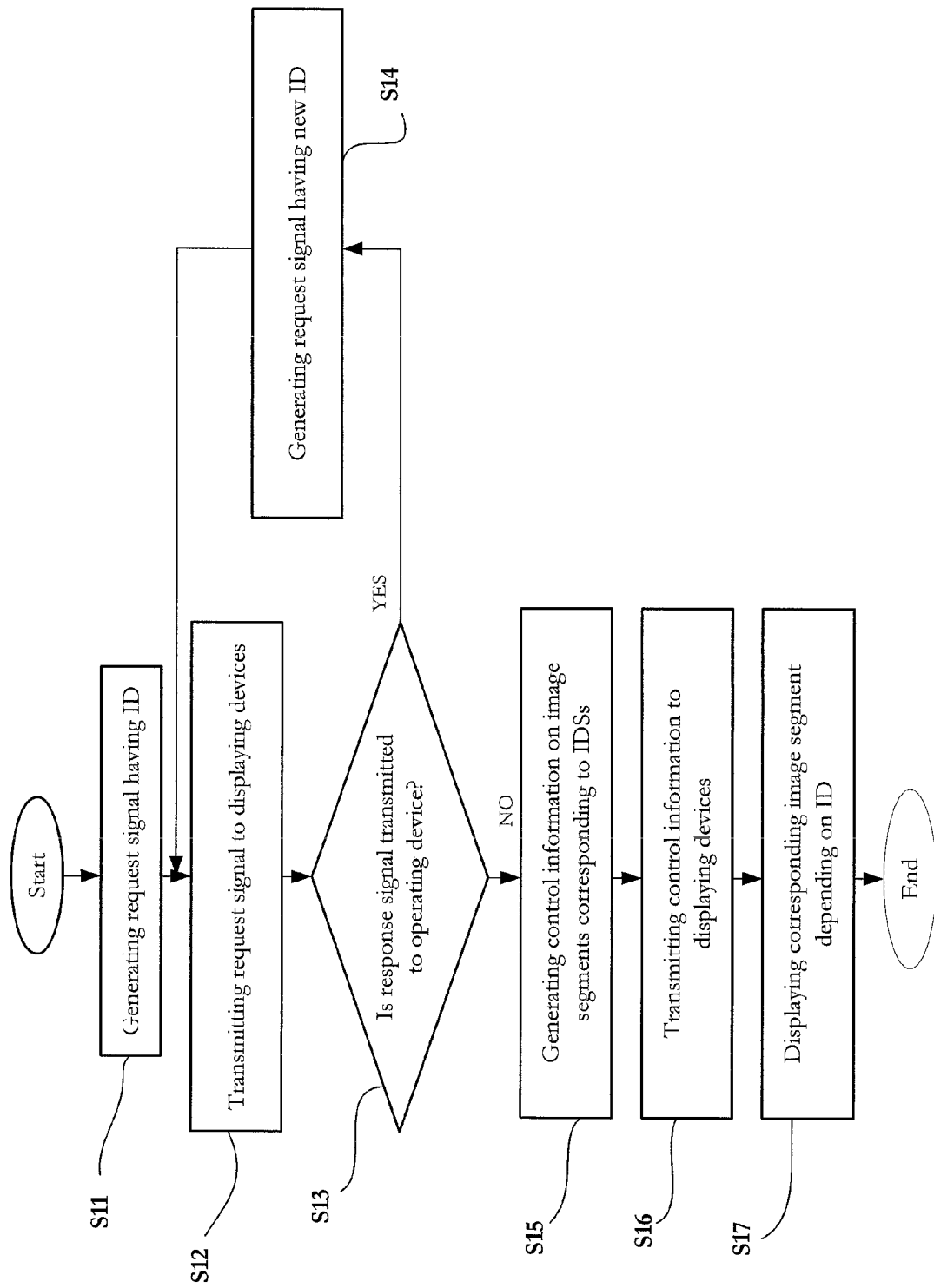
FIG. 3 is a flowchart illustrating a multi-screen implementation method according to the present invention.

Next, a multi-screen implementation method according to the present invention will be described with reference to the flowchart of FIG. 3. In more detail, before the operating device 21 transmits the video to the displaying devices 31, 32, 33..., the operating device 21 identifies, for example, a number, a connection relation, and states of the displaying devices 31, 32, 33... To accomplish this, the operating device 21 generates a request signal having an ID (S11), and transmits the request signal to the first displaying device 31 (S12).

The controller 311 of the first displaying device 31 receives the request signal through the receiver (R31), and reads the first ID information included in the request signal. The ID information includes, for example, the number or the symbol of an image segment(s) among the entire video to be displayed through the first displaying device 31. For example, the first ID information can be simply expressed using a number such as "#1."

After the controller 311 reads the first ID information, the controller 311 stores the first ID information in a memory (not shown) and transmits a control signal to the switch (SW1) to switch-on the switch (SW1). Further, the controller 311 transmits a response signal in response to the request signal to the operating device 21 through the transmitter (T31).

The response signal includes a variety of information about the first displaying device 31. For example, the response signal may include information about a resolution, a screen size, a luminance, a chrominance etc. of the first displaying device 31. The controller 311 may read information stored in the memory to obtain the information about the resolution, the screen size, the luminance, the chrominance etc. of the first displaying device 31, or may directly detect the information using, e.g., a test video.

Further, the controller 211 of the operating device 21 receives the response signal through the receiver (R21), and stores the information about the first displaying device 31, which as noted above is included in the received response signal. Thus, since the operating device 21 received a response from the displaying device 31, the operating device is able to confirm that at least the first displaying device 31 is connected to the operating device 21. The process then continues to determine if other displaying devices are connected to the operating device 21.

In more detail, the operating device 21 determines whether or not the response signal from a displaying device is transmitted within a predetermined time (S13). If the controller 211 does not receive the response signal within a predetermined time No in S13), the controller 211 determines no other displaying devices exist, and stops transmitting request signals. The process will then proceed to steps S15-S17.

However, if the controller 211 receives the response signal from the first displaying device 31 (Yes in S13), the controller 211 generates a request signal including a second ID information and transmits the generated request signal to the first displaying device 31 (S14, S12). Because the switch (SW1) of the displaying device 31 is in a 'switch-on' state, the request signal received at the first displaying device 31 is transmitted to the second displaying device 32 through the transmitter (T32).

The controller 321 of the second displaying device 32 receives the request signal through the receiver (R32), and reads the second ID information included in the request signal. As noted above, the ID information includes the number or the symbol of an image segment(s) among the entire video to be displayed through the second displaying device 32. For example, the second ID information can be simply expressed using the number such as "#2."

After the controller 321 reads the second ID information, the controller 321 stores the second ID information in the memory (not shown) and transmits a control signal to the switch (SW2) to switch on the switch (SW2). Further, the controller 321 transmits a response signal in response to the request signal to the operating device 21 through the transmitter (T33).

As discussed above, the response signal includes a variety of information about the second displaying device 32 such as the resolution, screen size, luminance, chrominance, etc. Further, the controller 321 may read information stored in the memory to obtain information on the resolution, the screen size, the luminance, the chrominance, etc. of the second displaying device 32, or may directly detect the information using a test video, for example.

The controller 211 of the operating device 21 receives the response signal through the receiver (R21), and stores the information about the second displaying device 32. If the controller 211 does not receive the response signal within a predetermined time, the controller 211 determines only the first displaying device 31 is active or connected and thus the controller 211 does not output any more request signals.

The above processes continue until all displaying devices having been identified. For example, if the controller 211 receives the response signal from the second displaying device 32, the controller 211 transmits a request signal including a third ID information to the first displaying device 31. Because the switches (SW1 and SW2) of the first and second displaying devices 31 and 32 are in a 'switch-on' state, the request signal is transmitted to the third displaying device 33 through the first and second displaying devices 31 and 32.

The third displaying device 33 then stores the third ID information and transmits a response signal in response to the request signal to the operating device 21 in the same manner as the first and second displaying devices 31 and 32. Additionally, the above described signal transmission and reception process is repeated. For example, if the controller 211 does not receive the response signal within a predetermined time, the controller 211 determines there are no more displaying devices and stops transmitting request signals.

When the IDs are allocated to all of the displaying devices 31, 32, 33 . . . , the operating device 21 generates control information relating to the video to be displayed (S15), and outputs the control information to the displaying devices (S16). The corresponding image segments are then displayed on the appropriate displaying devices (S17).

Figure 4:
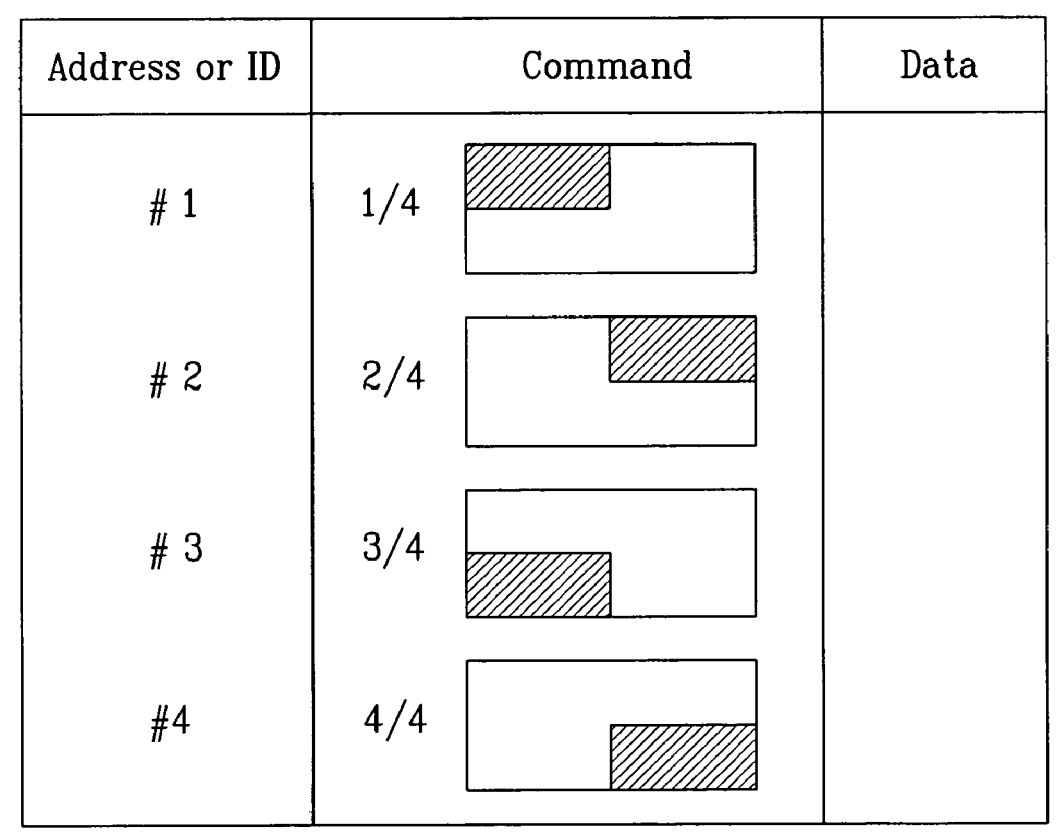

Turning now to FIG. 4, which illustrates an example of the control information transmitted to four displaying devices. As shown, the control information includes the IDs allocated to the displaying devices 31, 32, 33 . . . , and positions and orders of the image segments corresponding to the IDs.

Figure 5:
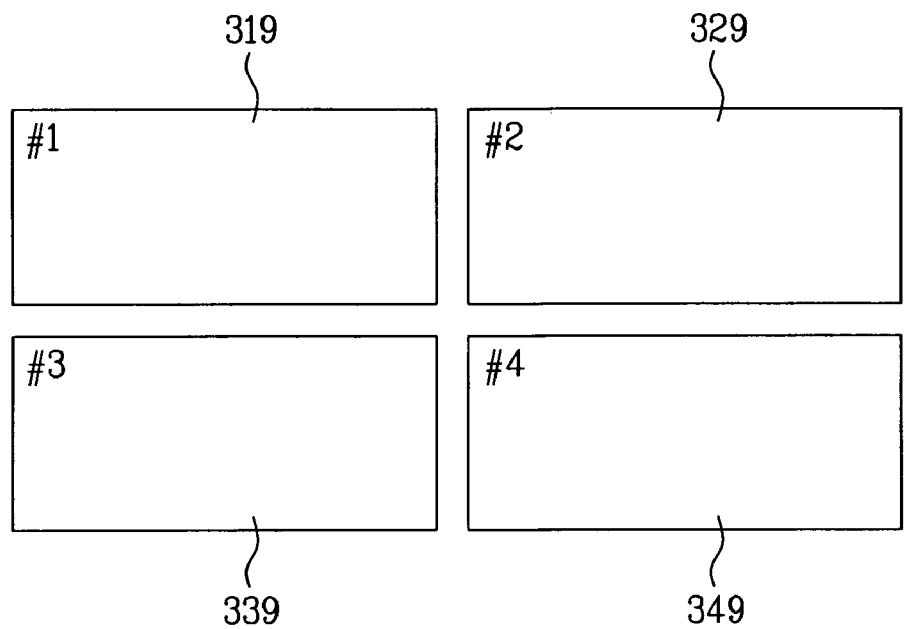
FIG. 5 is a view illustrating an example of a multi-screen according to the present invention.

Further, the displaying devices 31, 32, 33 . . . receive the control information, and confirm the positions and the orders of the image segments corresponding to their own IDs in the received control information. Additionally, the displaying devices 31, 32, 33 . . . receive a video signal corresponding to the entire video through the video-line, but extract only the image segment(s) corresponding to their own ID among the entire video based on the control information. After that, as shown in FIG. 5, the displaying devices 31, 32, 33 . . . respectively magnify the image segment(s) to display the magnified image segments on screens 319, 329, 339 and 349 (S17 in FIG. 3).

Figure 6:
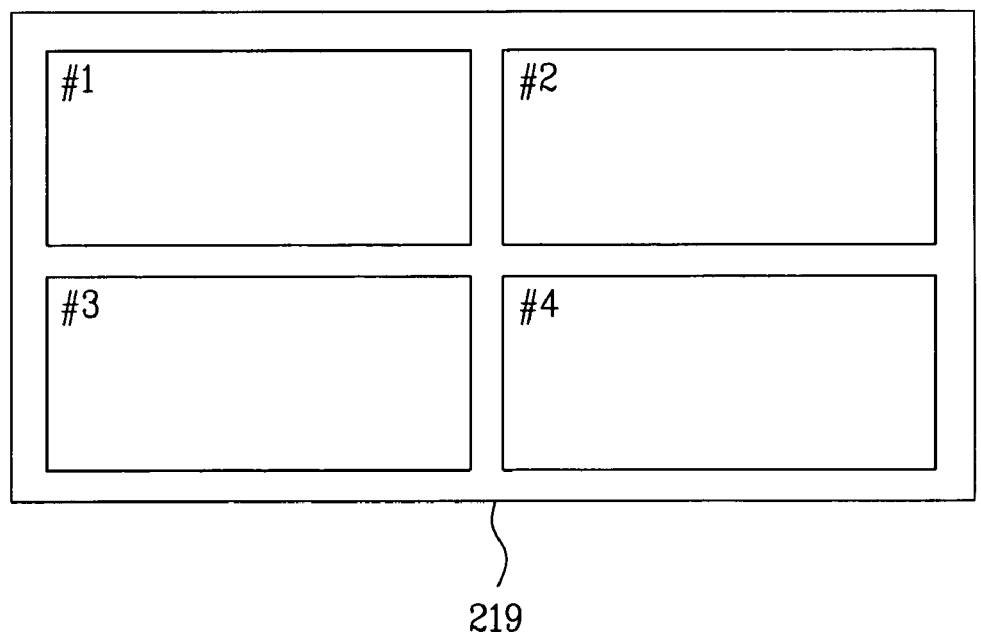
FIG. 6 is a view illustrating a multi-vision monitor of an operating device of FIG. 2.

Further, while the image segments are respectively displayed on the screens of the displaying devices 31, 32, 33 . . . , the controller 211 can also display the image segments in a multi-vision form through the operating device 21 or a monitor 219 of the image source, as shown in FIG. 6. At this time, the image segments displayed on the monitor 219 may include states or conditions of the displaying devices 31, 32, 33 . . . . For example, the image segments displayed on the monitor 219 may include the resolution, the size, the luminance, the chrominance and the like. In other words, the controller 211 displays the image segments on the monitor 219 based on the information about the displaying devices 31, 32, 33 . . . that is stored in the operating device 21. Accordingly, a user can monitor the displayed image segments through the operating device 21 or the monitor 219 connected to the image source. Further, the operating device 21 can display the information about the displaying devices 31, 32, 33 . . . through the monitor 219 to provide the information to the user.

In addition, the operating device 21 can control the resolutions, the screen sizes, the luminance, the chrominance and the like of the displaying devices 31, 32, 33 . . . For example, when any one of the luminance or chrominance of the displaying devices 31, 32, 33 . . . is different from those of remaining displaying devices or when the luminance or chrominance of the displaying devices 31, 32, 33 . . . are different from one another, the displaying devices 31, 32, 33 . . . can be controlled to reduce the deviation of the luminance or chrominance.

In addition, the above description is described with reference to using a bi-directional data line between the operating device 21 and the displaying devices 31, 32, 33 . . . to transmit the video, request and response signals. However, a separate video line may be used to transmit the video and a separate bi-directional data line to transmit/receive the request/response signals. That is, the data line in FIG. 2 may be replaced with a separate video and data line. Thus, because a separate data and video line is used, the control information can be efficiently provided to the displaying devices via the dedicated data line and the video can be efficiently provided to the displaying devices via the dedicated video line. Further, if one of the video or data lines was disrupted, the other data line may be used to transmit both the video and control information.

As described above, because the IDs are respectively allocated to the displaying devices, the displaying devices can be configured to display only the image segments corresponding to their own IDs. Accordingly, the present invention advantageously automatically splits and displays the video without requiring a user to manually configure or set the number of displaying devices used, etc.

Further, the operating device according to the present invention determines the number, the states and the like of the displaying devices and stores this information. Additionally, based on the stored information, the displaying devices can be effectively controlled.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A multi-screen system, comprising:
    at least one display device configured to output a response signal in response to a received request signal, each display device including a switch configured to provide a controllable connection between an input port of a first display device and an input port of a second display device, the received request signal being selectively provided to the second display device via the controllable connection; and
    an operating device configured to transmit a request signal to the first display device, the request signal including an identifier (ID) to be allocated to the first display device, and to transmit a new request signal to the second display device if said operating device receives a response signal from the first display device.

2. The multi-screen system as claimed in claim 1, wherein each display device further comprises:
    a controller for generating the response signal in response to the received request signal and for controlling the switch to be in one of a switched-on state and a switched-off state.

3. The multi-screen system as claimed in claim 2, wherein the new request signal is passed from the first display device to the second display device via the switched-on switch.

4. The multi-screen system as claimed in claim 2, wherein the switch of a corresponding display device is controlled to be in the switched-off state before the corresponding display device receives the request signal and is controlled to be in the switched-on state upon output of the response signal.

5. The multi-screen system as claimed in claim 2, wherein, in response to the received request signal, the controller of each display device extracts the ID included in the received request signal, assigns the extracted ID to the corresponding display device, and controls the switch to the switched-on state from the switched-off state, whereby a next received request signal is passed to another display device.

6. The multi-screen system as claimed in claim 1, wherein each display device further comprises:
    a first output port for transmitting a response signal to said operating device in response to a request signal received at its input port; and
    a second output port for transmitting the received request signal to the second display device.

7. The multi-screen system as claimed in claim 1, wherein the response signal includes display information generated by each display device, the display information indicating a display condition of the corresponding display device by including at least one of a resolution, a screen size, a luminance, and a chrominance.

8. The multi-screen system as claimed in claim 7, wherein the display information is obtained by one of retrieval from a memory included in the corresponding display device and a detection of display information using a test video applied to the corresponding display device.

9. The multi-screen system as claimed in claim 7, wherein the display information is received by said operating device and wherein said operating device includes a display for displaying the received display information according to image segment of an image source.

10. The multi-screen system as claimed in claim 7, wherein said operating device transmits control information to said at least one display device, based on the display information included in the response signal transmitted from a corresponding display device.

11. The multi-screen system as claimed in claim 1, wherein said operating device comprises:
    an output port for transmitting a request signal to the first display device; and
    an input port for receiving response signals from said at least one display device.

12. The multi-screen system as claimed in claim 1, wherein said operating device is further configured to generate control information to be transmitted to each display device if said operating device does not receive a response signal within a predetermined time.

13. The multi-screen system as claimed in claim 12, wherein the generated control information includes the IDs respectively allocated to said at least one display device to indicate an image segment to be displayed on the display device corresponding to an allocated ID.

14. The multi-screen system as claimed in claim 12, wherein the generated control information indicates, according to ID allocation, a position and sequence of the image segment of each display device, the image segments forming an entire image of an image source.

15. The multi-screen system as claimed in claim 1, wherein said operating device is further configured to generate control information about image segments to be respectively displayed on said at least one display device to form an entire image.

16. The multi-screen system as claimed in claim 15, further comprising:
    a bi-directional data line for carrying the request and response signals and the control information transmitted from said operating device to the first display device; and
    a separate video line for carrying a video signal including the entire image, the video signal being transmitted from said operating device to the first display device.

17. The multi-screen system as claimed in claim 16, wherein the bi-directional data line further carries to said operating device display information obtained from each display device, the display information indicating a display condition of the corresponding display device by including at least one of a resolution, a screen size, a luminance, and a chrominance.

18. The multi-screen system as claimed in claim 1, wherein each display device further comprises: memory for storing the ID of the received request signal.

19. The multi-screen system as claimed in claim 18, wherein said memory stores display information to be included in the response signal to be outputted in response to the received request signal.

20. The multi-screen system as claimed in claim 1, wherein the new request signal includes a new ID.

21. The multi-screen system as claimed in claim 1, wherein said operating device is configured to transmit a first request signal including an ID to be allocated to the first display device and to transmit a second request signal including an ID to be allocated to the second display device.

22. A multi-screen system, comprising:
a first display device, including a first switch, configured to output a first response signal in response to a first request signal including a first identifier (ID) to be allocated to said first display device; and
a second display device, including a second switch, configured to output a second response signal in response to a second request signal including a second ID to be allocated to said second display device,
wherein the first switch is configured to provide a controllable connection between an input port of said first display device and an input port of said second display device, the first switch selectively providing the first request signal to said second display device,
wherein, in response to the received first request signal, said first display device assigns the first ID to said first display device,
controls the first switch to be a switched-on state from a switched-off state, the first response signal being output after the first switch is controlled,
receives the second request signal, and
passes the second request signal to said second display device via the switched-on switch of said first display device, and
wherein, in response to the passed second request signal, said second display device assigns the second ID to said second display device and controls the second switch to be a switched-on state from a switched-off state, the second response signal being output after the second switch is controlled.

23. A multi-screen implementation method, comprising:
sequentially transmitting request signals to at least one display device, each request signal including an identifier (ID) to be allocated to a corresponding display device;
controlling a switch included in each display device according to the request signal received by the corresponding display device, the switch configured to provide a controllable connection between an input port of a first display device and an input port of a second display device, the received request signal being selectively provided to the second display device via the controllable connection;
determining whether a response signal is received at an operating device in correspondence to a transmitted request signal; and
transmitting, based on said determining, at least one of a new request signal and control information, the new request signal being transmitted to a second display device and the control information being transmitted to the first and second display devices and indicating image segments to be respectively displayed on the first and second display devices.

* * * * *